Patented Sept. 17, 1929

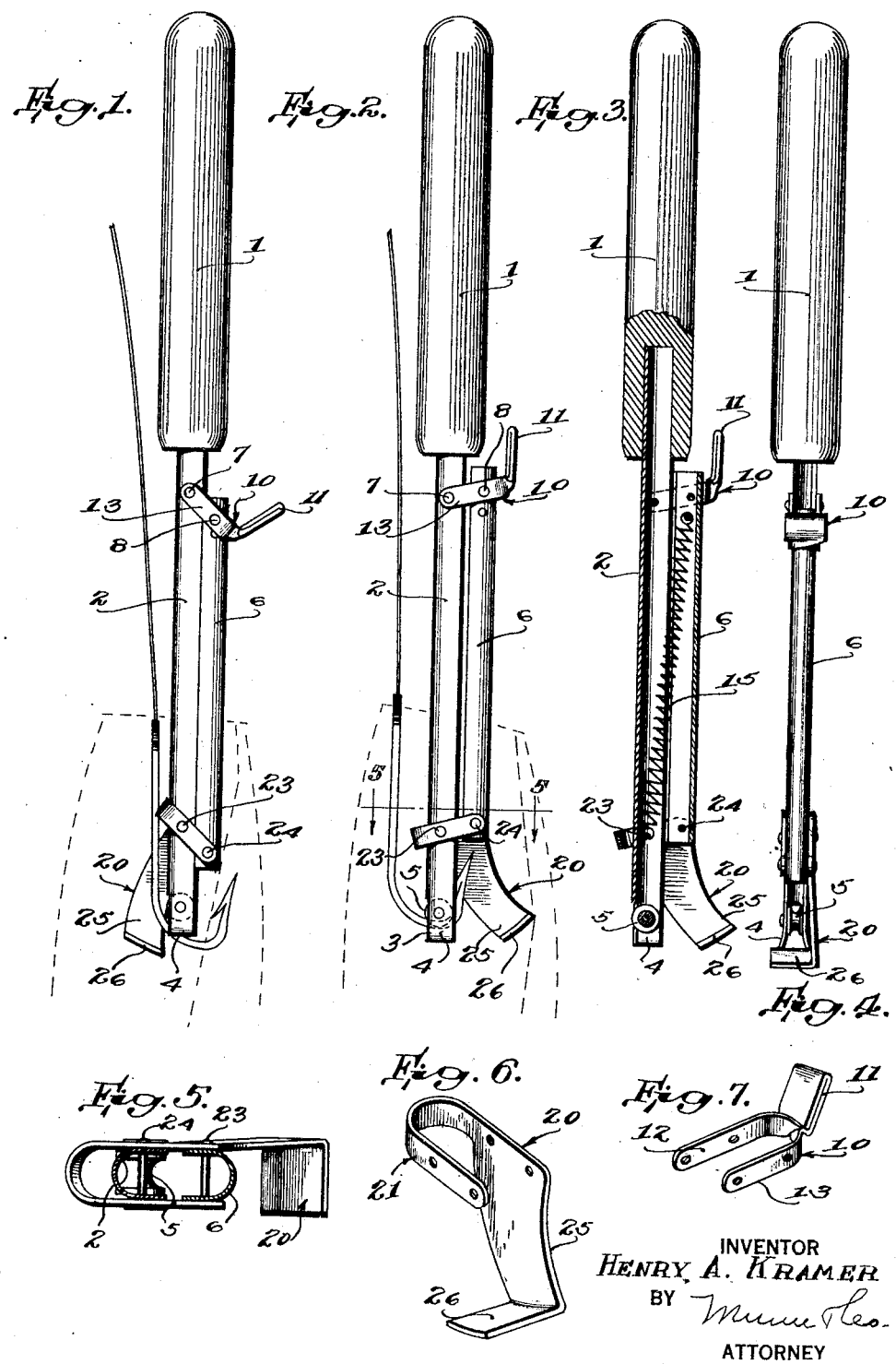

1,728,864

UNITED STATES PATENT OFFICE

HENRY A. KRAMER, OF DETROIT, MICHIGAN

FISHHOOK DISGORGER

Application filed March 30, 1928. Serial No. 265,913.

This invention relates to fish hook disgorgers and a primary object thereof is to provide a device of this character which may be cheaply constructed and easily operated and which will effectively release a hook from the fish.

Another object is to so construct such a device that after being released, the point of the hook is protected to prevent its re-engagement during its withdrawal from the mouth of the fish.

In carrying out these objects, the invention is susceptible of a wide range of modification without departing from the spirit or sacrificing any of the advantages of the claimed invention there being shown in the drawings for illustrative purposes a preferred and practical form, in which;

Figure 1 represents a side elevation of a fish hook disgorger constructed in accordance with this invention, shown engaged with the hook ready for releasing, the head of the fish being shown in dotted lines;

Fig. 2 is a similar view with the disgorger shown in releasing position with the point of the hook protected ready for withdrawal;

Fig. 3 is a longitudinal section of the device with the parts in the position shown in Fig. 2;

Fig. 4 is an edge or front view thereof taken in a plane at right angles to Fig. 3;

Fig. 5 is a horizontal section taken on the line 5—5 of Fig. 2;

Fig. 6 is a detail perspective view of the releasing member, and

Fig. 7 is a similar view of the trigger.

In the embodiment illustrated the disgorger constituting this invention comprises a handle 1 having a fixed shank 2 projecting longitudinally from one end thereof and made U-shaped in cross section as shown clearly in Fig. 5. This shank 2 is secured to the handle 1 in any suitable manner and at its free end is bifurcated with the rear wall thereof cutout as shown at 3 and between the furcations 4 of which is revolubly mounted a roller 5 having a grooved periphery and adapted to engage the inner portion of the fish hook as shown clearly in Figs. 1 and 2 when the device is in use.

A complementary movable shank member 6 is mounted over the open side of the shank 2 and is U-shaped or semi-circular in cross section to correspond with that of the shank and has its open face facing the open face of the shank so that when closed, as shown in Fig. 1, it will form a rounded member to facilitate its insertion in the mouth of the fish and to form a housing for a spring 15 to be described. This member 6 which constitutes a part of the releasing mechanism is connected with the shank 2 by means of a trigger member 10 located at the rear end thereof adjacent the handle 1 and at its front end by a stirrup-like hook releasing element 20. These members 10 and 20 pivotally connect the member 6 with the member 2 and adapt said member 6 to be swung toward and away from member 2 and to move longitudinally thereof, as is shown clearly in Figs. 1 and 2.

A coiled spring 15 is connected at one end with the front end of the member 2 and at its other end with the rear end of the member 6 on the inner faces of said members as is shown clearly in Fig. 3. This spring exerts its tension to normally hold the member 6 in closed position.

The trigger 10, which is made substantially U-shaped in form to straddle the members 6 and 2, is composed of a strip of metal folded intermediate its ends to provide a finger grip 11 which extends at an angle to the arms 12 and 13 thereof, which latter straddle the members 2 and 6 and are pivotally connected with them at spaced intervals as shown at 7 and 8.

The releasing member 20 is also struck out from a strip or sheet of metal and has a U-shaped member 21 designed to straddle the members 2 and 6 and to be pivotally connected with them at 23 and 24. Projecting edgewise from one arm of the member 21 is a plate or arm 25 having a right angular inward extension 26 which, when the parts are in normal position, is designed to be located at the back of the member 2 with the foot 26 in position to swing back and forth over the free ends of the furcations 4 of said member.

When the trigger 10 is moved rearwardly against the tension of the spring 15, it will operate to swing the member 6 away from the member 2 causing at the same time the hook releasing element 20 to swing forwardly into the position shown in Figs. 2 and 3, thereby forcing the point of the hook out of the fish, and position it where it will be covered and protected by the member 20, as shown in Fig. 2.

The free ends of the furcations 4 of the shank 2 are flared, as shown in Fig. 4, to facilitate the engagement of this end with the shank of the hook.

It will thus be obvious that in the use of this disgorger, it is only necessary that the flared bifurcated ends of the shank 2 be set on the hook in the fish's mouth and with a little tension on the line and the pulling rearwardly of the trigger will cause the releasing element 20 to swing around and extract the hook and protect the point thereof so that it will not re-engage when the disgorger is withdrawn. After the hook has been drawn out of the fish's mouth the trigger is released and the parts will return to normal position ready for the next use.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. A fish hook disgorger comprising a shank having hook engaging means, and trigger controlled means for releasing the hook and housing it after its release.

2. A device of the class described comprising a hook engaging member, and means operable from a point remote to move over the hook and its engaging means and disengage the hook from the fish.

3. A device of the class described comprising a shank having one end bifurcated to straddle a fish hook, a member swingable back and forth over said bifurcated end to expose and conceal the point of the hook engaged by said end, said member having means projecting in advance of said hook to release it from the fish.

4. A device of the class described comprising a shank having one end bifurcated to straddle a fish hook, a member swingable back and forth over said bifurcated end to expose and conceal the point of the hook engaged by said end, said member having a forwardly projecting foot to swing in advance of said hook and release it from the fish.

5. A device of the class described, comprising an elongated shank having fish hook engaging means, a hook disengaging member pivoted on said shank, a trigger also pivoted on said shank, and a connection between said trigger and said hook releasing member whereby the latter may be actuated at a point remote by the former.

HENRY A. KRAMER.